(12) United States Patent
Burnier et al.

(10) Patent No.: US 9,010,467 B2
(45) Date of Patent: Apr. 21, 2015

(54) SHARED POWER STREET SWEEPER (75) Inventors: Timothy A. Burnier, Sleepy Hollow, IL (US); John D. Padgett, South Elgin, IL (US)

(73) Assignee: Federal Signal Corporation, Oak Brook, IL (US)

( * ) Notice: Subject to any disclaimer, the term of this patent is extended or adjusted under 35 U.S.C. 154(b) by 49 days.

(21) Appl. No.: 13/453,793

(22) Filed: Apr. 23, 2012

(65) Prior Publication Data

US 2013/0277127 A1 Oct. 24, 2013

(51) Int. Cl.
| | |
|---|---|
| *B60K 25/00* | (2006.01) |
| *B60K 5/08* | (2006.01) |
| *B60K 17/28* | (2006.01) |
| *B60K 25/06* | (2006.01) |
| *E01H 1/05* | (2006.01) |

(52) U.S. Cl.
CPC .............. *B60K 25/06* (2013.01); *B60Y 2200/14* (2013.01); *E01H 1/053* (2013.01); *Y10T 74/19014* (2015.01)

(58) Field of Classification Search
USPC ........... 180/53.1, 53.4, 53.5, 53.6, 69.6, 53.8, 180/305, 306, 165; 15/78
See application file for complete search history.

(56) References Cited

U.S. PATENT DOCUMENTS

| | | | | | |
|---|---|---|---|---|---|
| 2,419,912 | A | * | 4/1947 | Ormsby | ........................ 180/69.6 |
| 2,427,863 | A | * | 9/1947 | Ormsby et al. | ............... 180/69.6 |
| 3,294,369 | A | * | 12/1966 | Butler | ........................... 254/340 |
| 3,854,160 | A | | 12/1974 | Hildebrand et al. | |
| 4,109,336 | A | | 8/1978 | Ford | |
| 4,193,159 | A | | 3/1980 | Beard, III | |
| 4,448,157 | A | * | 5/1984 | Eckstein et al. | ....... 123/142.5 R |
| 4,632,200 | A | | 12/1986 | Doyen et al. | |
| 4,773,119 | A | | 9/1988 | Duthie et al. | |
| 4,802,549 | A | | 2/1989 | Martinez | |

(Continued)

FOREIGN PATENT DOCUMENTS

| | | |
|---|---|---|
| DE | 10 2009 028 056 A1 | 2/2010 |
| EP | 0 742 118 A1 | 11/1996 |

OTHER PUBLICATIONS

'Hydraulic Motor'. Wikipedia [online] [Retrieved Feb. 20, 2010]. Retrieved from Internet Archive: <URL:http://web.archive.org/web/20100220102400/http://en.wikipedia.org/wiki/Hydraulic_motor>.*

(Continued)

*Primary Examiner* — Ruth Ilan
*Assistant Examiner* — Barry Gooden, Jr.
(74) *Attorney, Agent, or Firm* — Merchant & Gould P.C.

(57) ABSTRACT

A power delivery system for a vehicle is disclosed. In one embodiment, the power delivery system includes a chassis engine configured to power driving functions of the vehicle and an auxiliary engine configured to power non-driving hydraulic functions of the vehicle. The power delivery system may also include a power boost system comprising a hydraulic pump and a hydraulic motor in fluid communication with each other. The hydraulic pump may be coupled to a power output of the chassis engine while the hydraulic motor may be coupled to a power output of the auxiliary engine. In one embodiment, the power delivery system has a power sharing mode in which power is transferred from the chassis engine power output to the auxiliary engine power output via the hydraulic pump and motor such that the non-driving hydraulic functions of the vehicle are simultaneously powered by the chassis engine and the auxiliary engine.

9 Claims, 9 Drawing Sheets

(56) References Cited

U.S. PATENT DOCUMENTS

| | | | |
|---|---|---|---|
| 5,054,152 A | 10/1991 | Hulicsko | |
| 5,239,830 A | 8/1993 | Banthin et al. | |
| 6,281,646 B1 | 8/2001 | Masberg et al. | |
| 6,547,685 B2* | 4/2003 | Kawada et al. | 475/23 |
| 6,625,983 B2* | 9/2003 | Kawasaki | 60/468 |
| 6,789,291 B2 | 9/2004 | Velinsky et al. | |
| 6,948,213 B2 | 9/2005 | Kim | |
| 7,013,646 B1* | 3/2006 | Serkh et al. | 60/698 |
| 7,150,062 B2 | 12/2006 | Charky et al. | |
| 7,469,761 B2 | 12/2008 | Kuras et al. | |
| 7,654,355 B1* | 2/2010 | Williams | 180/165 |
| 7,974,757 B2* | 7/2011 | Mackin et al. | 701/50 |
| 7,992,370 B2* | 8/2011 | Sheidler et al. | 56/10.7 |
| 8,051,529 B2 | 11/2011 | Shea | |
| 8,323,144 B1* | 12/2012 | Bin et al. | 477/2 |
| 8,337,359 B2* | 12/2012 | Hofbauer | 477/5 |
| 2003/0070848 A1* | 4/2003 | Hasegawa et al. | 180/53.1 |
| 2005/0155170 A1 | 7/2005 | Charky et al. | |
| 2007/0017729 A1* | 1/2007 | Nishimoto et al. | 180/374 |
| 2008/0216878 A1* | 9/2008 | Shea | 134/198 |
| 2009/0233664 A1* | 9/2009 | Sheidler et al. | 460/119 |
| 2009/0233759 A1* | 9/2009 | Sheidler et al. | 477/3 |
| 2009/0308036 A1* | 12/2009 | Sheidler | 56/10.7 |
| 2010/0011523 A1* | 1/2010 | Larkowski et al. | 15/78 |
| 2010/0056327 A1* | 3/2010 | Hofbauer | 477/5 |
| 2010/0105259 A1* | 4/2010 | Wejrzanowski et al. | 440/3 |
| 2010/0133031 A1* | 6/2010 | Mendler | 180/165 |
| 2010/0162593 A1* | 7/2010 | Hughes et al. | 37/410 |
| 2010/0280697 A1* | 11/2010 | Yanagisawa et al. | 701/22 |
| 2010/0293912 A1* | 11/2010 | Mackin et al. | 56/10.2 R |
| 2010/0293913 A1* | 11/2010 | Mackin et al. | 56/10.2 R |
| 2013/0239559 A1* | 9/2013 | Ishikawa et al. | 60/414 |

OTHER PUBLICATIONS

International Search Report and Written Opinion for PCT/US2013/037605 mailed Aug. 5, 2013.

* cited by examiner

SHARED POWER STREET SWEEPER

BACKGROUND

Street sweeping vehicles are often provided with an auxiliary engine in addition to the main chassis engine. The purpose of an auxiliary engine is to provide a dedicated power source to non-driving functions of the street sweeping vehicle. Examples of non-driving functions are broom operation, blower/fan operation, conveyor operation, and dumping of the hopper. In such arrangements, it is sometimes the case that the chassis engine will also be configured to separately provide power to non-driving functions as well. This allows for the auxiliary engine to be designed at a smaller maximum output capacity since less total load is placed on the auxiliary engine. However, this type of configuration can be disadvantageous in that a failure of the chassis engine system can prevent the operation of some or all of the non-driving functions. Additionally, energy normally lost to heat during braking and deceleration of the vehicle is generally not able to be recaptured in these types of systems. Improvements are desired.

SUMMARY

A power delivery system for a vehicle, such as a street sweeper, is disclosed. In one embodiment, the power delivery system includes a chassis engine configured to power driving functions of the vehicle and an auxiliary engine configured to power non-driving functions of the vehicle. The power delivery system may also include a power boost system comprising a first and second power transmission device in power communication with each other. In one embodiment, the power transmission devices are a hydraulic pump and a hydraulic motor, respectively. The first power transmission device may be coupled to a power output of the chassis engine while the second power transmission device may be coupled to a power output of the auxiliary engine. In one embodiment, the power delivery system has a power sharing mode in which power is transferred from the chassis engine power output to the auxiliary engine power output via the first and second power transmission devices such that the non-driving functions of the vehicle are simultaneously powered by the chassis engine and the auxiliary engine.

A method for simultaneously powering at least one non-driving function of a vehicle with a chassis engine and an auxiliary engine is also disclosed. In one step of the method, a first power transmission device, such as a hydraulic pump, is coupled to a power output of the chassis engine. In another step of the method, a second power transmission device, such as a hydraulic motor, is coupled a power output of the auxiliary engine. The auxiliary engine may be configured to power at least one non-driving function. Another step in the method is placing the first and second power transmission devices in power communication with each other, such as with a hydraulic circuit. Yet another step is transferring power from the chassis engine power output to the auxiliary engine power output via the first and second power transmission devices such that the non-driving functions of the vehicle can be simultaneously powered by the chassis engine and the auxiliary engine. In one embodiment, the driving functions of the vehicle can be simultaneously powered by the chassis engine and the auxiliary engine in a second power sharing mode.

DESCRIPTION OF THE DRAWINGS

Non-limiting and non-exhaustive embodiments are described with reference to the following figures, which are not necessarily drawn to scale, wherein like reference numerals refer to like parts throughout the various views unless otherwise specified.

DETAILED DESCRIPTION

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

Figure 1:
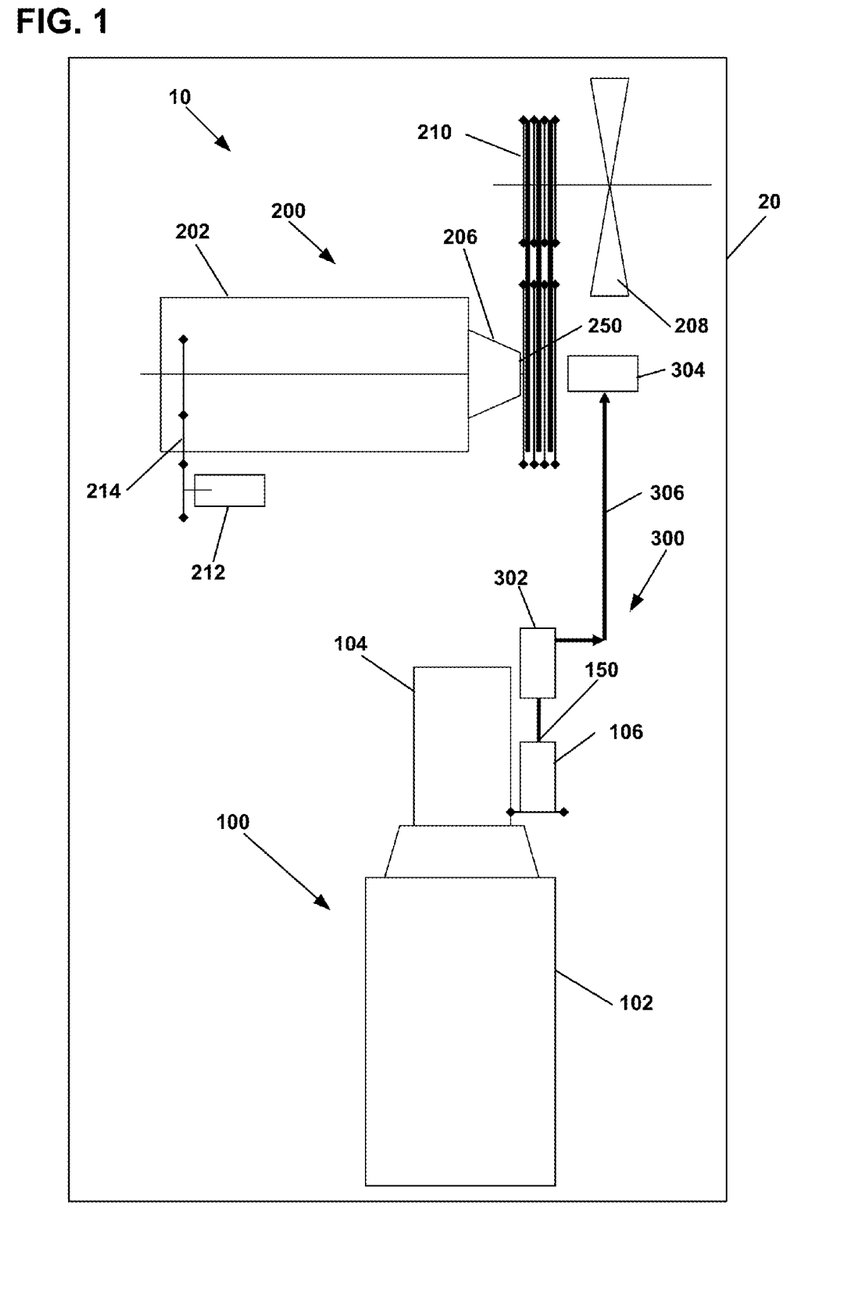
FIG. 1 is a schematic view of a power delivery system having features that are examples of aspects in accordance with the principles of the present disclosure.
Figure 10:
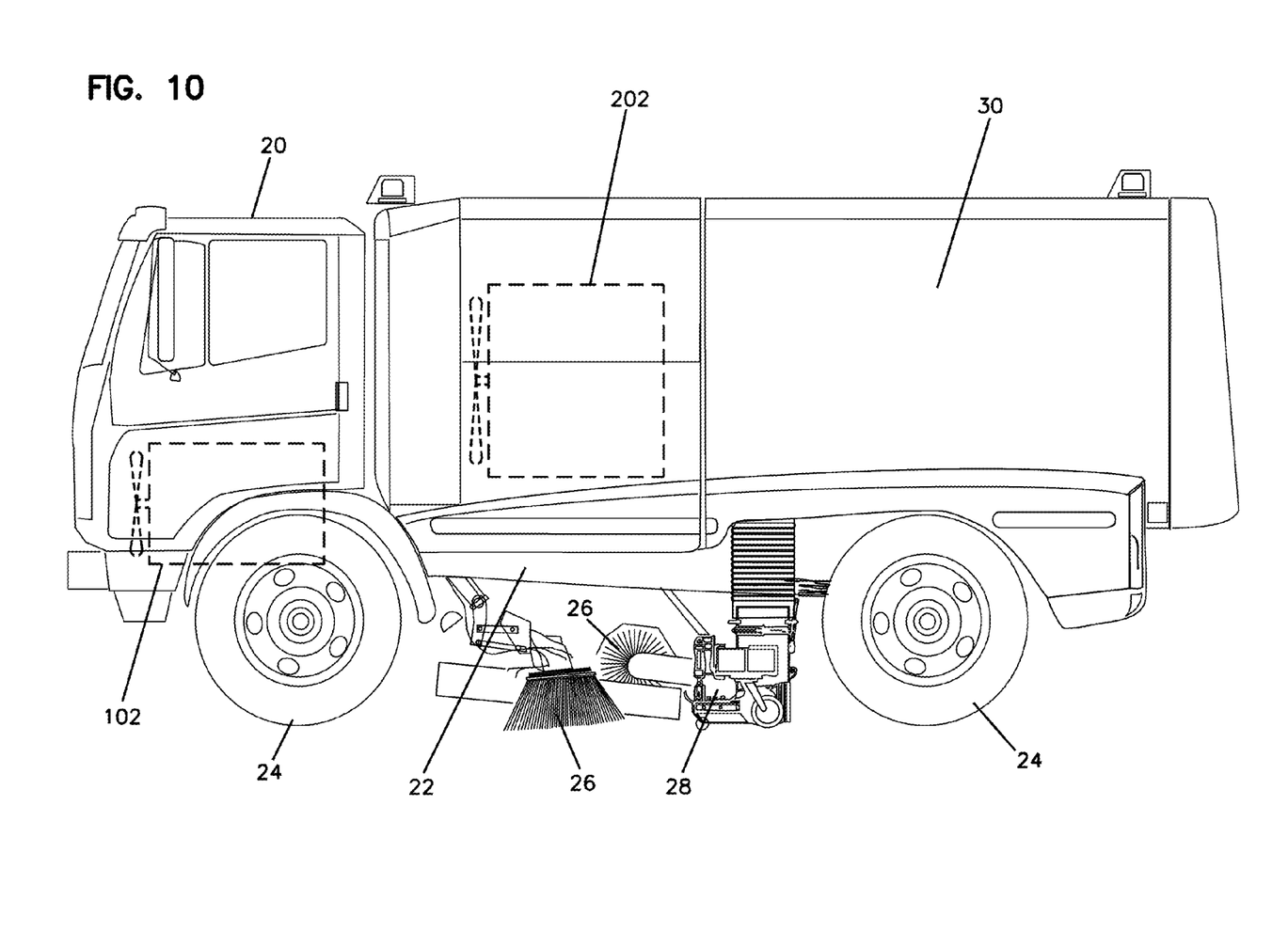
FIG. 10 is a side view of a street sweeping vehicle suitable for use with the power delivery system shown in FIG. 1.
Figure 11:
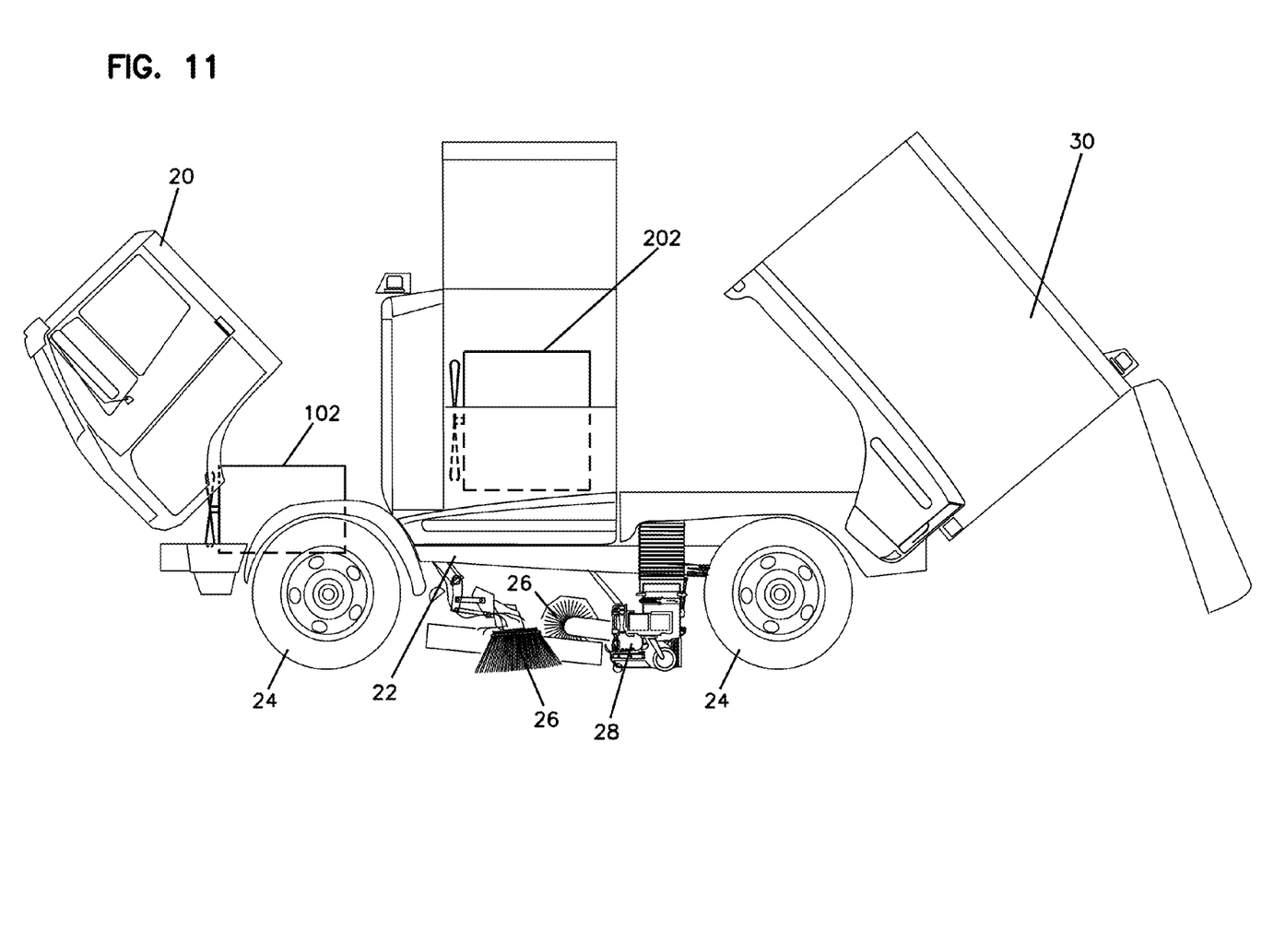
FIG. 11 is a side view of the street sweeping vehicle shown in FIG. 10 that is arranged such that the engines of the vehicle are exposed.

Referring to FIG. 1, a power delivery system 10 and a vehicle 20 is schematically shown. In one embodiment, the vehicle 20 is a street sweeping vehicle, such as that shown in FIGS. 10-12. As shown, the street sweeping vehicle 20 includes a chassis 22, wheels 24, brooms 26, vacuum nozzle 28, and a hopper 30. The power delivery system 10 includes a chassis power system 100, an auxiliary power system 200, and a power boost system 300. The chassis power system 100 is primarily responsible for providing power for the driving functions of the vehicle 20. Examples of driving functions that require power are the vehicle drive train, the steering system, and the braking system. The auxiliary power system 200 is primarily for providing power to auxiliary operations associated with the vehicle 20, for example hydraulic functions (not shown) can be driven by a hydraulic pump 212. Examples of auxiliary components that require power in a street sweeper application are fans/blowers, scarifying brooms, the hopper, and the conveyor.

In the embodiment shown, the chassis power system 100 includes an internal combustion engine 102 and a transmission 104 coupled to an output shaft (not shown) of the internal combustion engine 102. A power take-off (PTO) unit 106 is also shown as being mounted to the transmission 104. FIGS.

Figure 5:
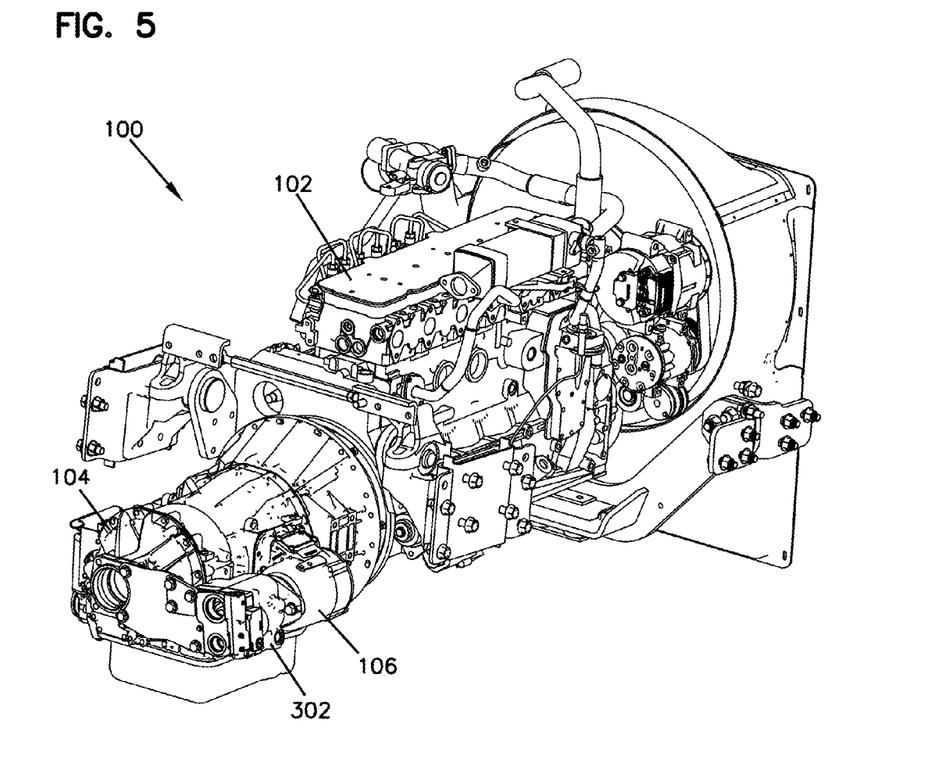
FIG. 5 is a perspective view of an exemplary embodiment of a portion of the power delivery system shown in FIG. 1, including a chassis engine.
Figure 6:
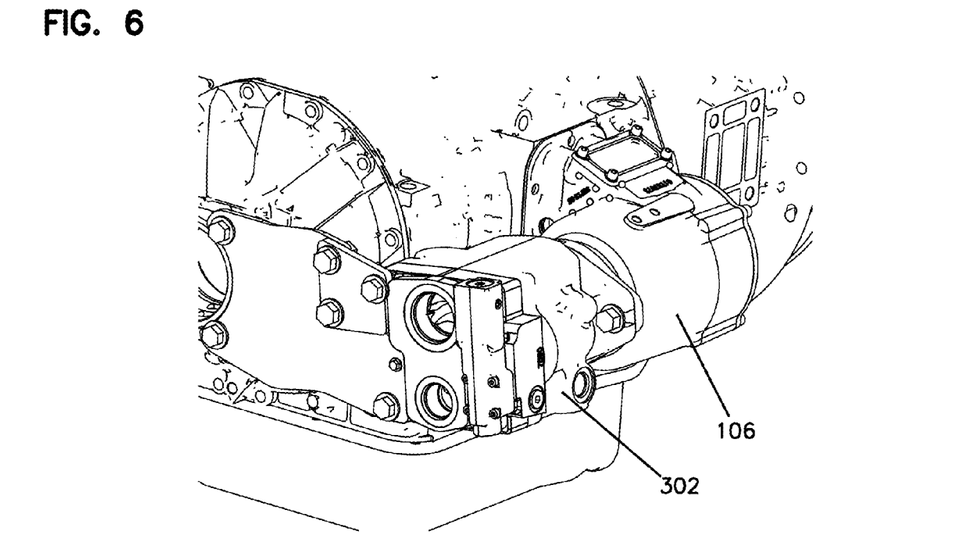
FIG. 6 is a close up perspective view of the system shown in FIG. 5.

5 and 6 show an exemplary embodiment of the chassis power system 100 wherein a first power transmission device 302 is mounted to and driven by the PTO 106 which is in turn mounted to and driven by the transmission 104.

Figure 7:
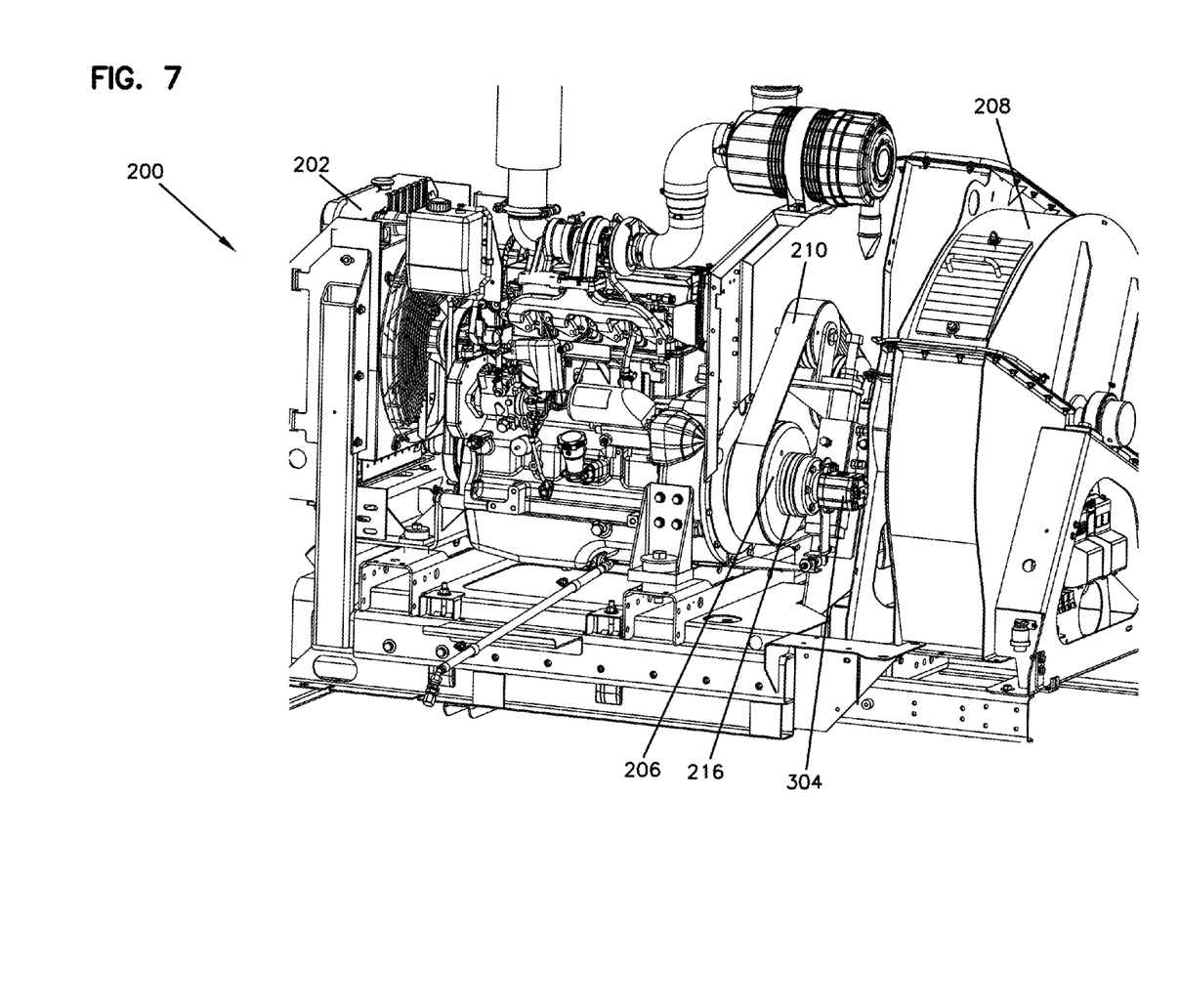
FIG. 7 is a perspective view of an exemplary embodiment of a portion of the power delivery system shown in FIG. 1, including an auxiliary engine.
Figure 8:
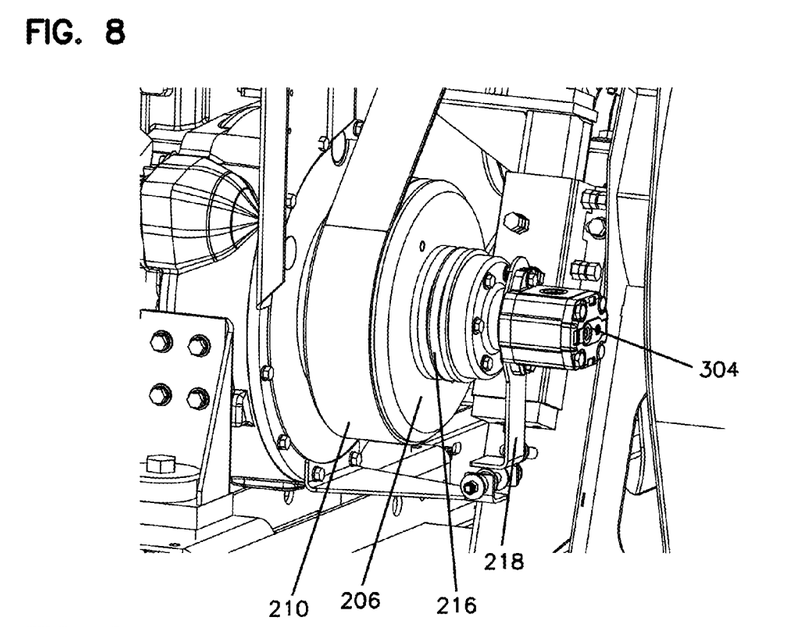
FIG. 8 is a close up perspective view of the system shown in FIG. 7.
Figure 9:
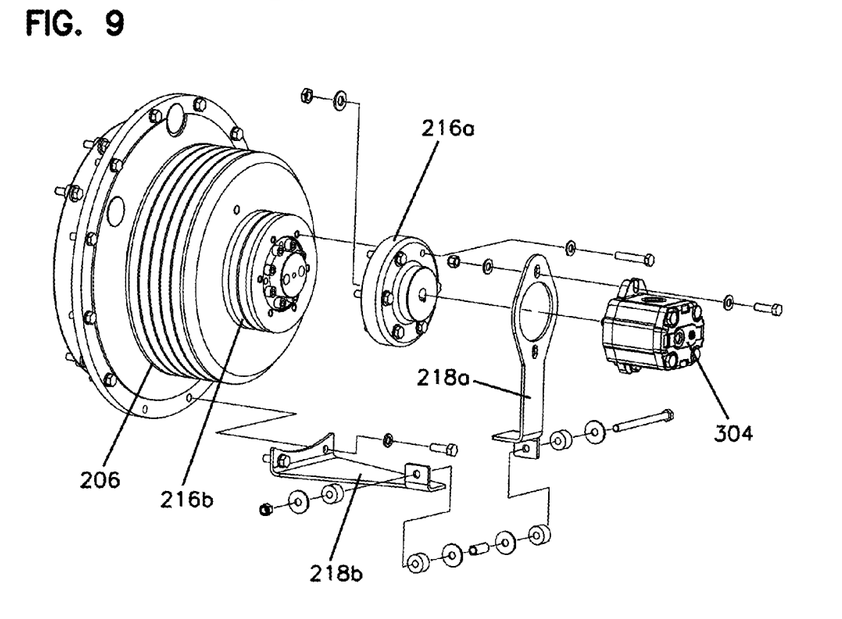
FIG. 9 is an exploded perspective view of the power take off unit and hydraulic motor shown in FIGS. 7 and 8.

As shown, the auxiliary power system 200 includes an internal combustion engine 202. Auxiliary power system 200 is further shown as including a power take-off (PTO) unit 206 that provides power to a fan 208 via a belt drive system 210. Additionally, auxiliary power system 200 is shown as having an accessory power take off 212 driven by the engine 202 via a gear drive and/or belt drive system 214. FIGS. 7-9 show an exemplary embodiment of the auxiliary power system 200 wherein a second power transmission device 304 (discussed below) is operably connected to the PTO 206 which is in turn mounted to and driven by the auxiliary engine 202. In the embodiment shown in FIGS. 7-9, device 304 is a hydraulic motor. As most easily seen at FIGS. 8 and 9, an adapter assembly 216, having a first adapter part 216a and a second adapter part 216b, is mounted between the PTO 206 and the hydraulic motor 304. A bracket assembly 218, having a horizontal extension 218b and a vertical extension 218a are provided to constrain the torque reaction of the device 304, where necessary.

Still referring to FIG. 1, a hydraulic power boost system 300 is also shown. Power boost system 300 is for transferring power from the chassis power system 100 to the auxiliary power system 200. During some operations, the chassis engine 102 may be underutilized while the auxiliary engine 202 may be at peak capacity. In such instances, the power boost system 300 can transfer excess power available from the chassis engine 102 to the auxiliary engine 202. This configuration allows for the chassis engine 102 to simultaneously provide power to the driving functions of the vehicle and to the auxiliary engine 202, and for the engines 102, 202 to simultaneously power the non-driving functions of the vehicle 20. The power boost system 300 can also be configured to reclaim and deliver energy from the movement of the vehicle chassis 22 to the auxiliary power system 200 as well. For example, the power boost system 300 can transfer energy developed by braking, deceleration, or engine-braking the vehicle 20 to the auxiliary power system 200.

Figure 12:
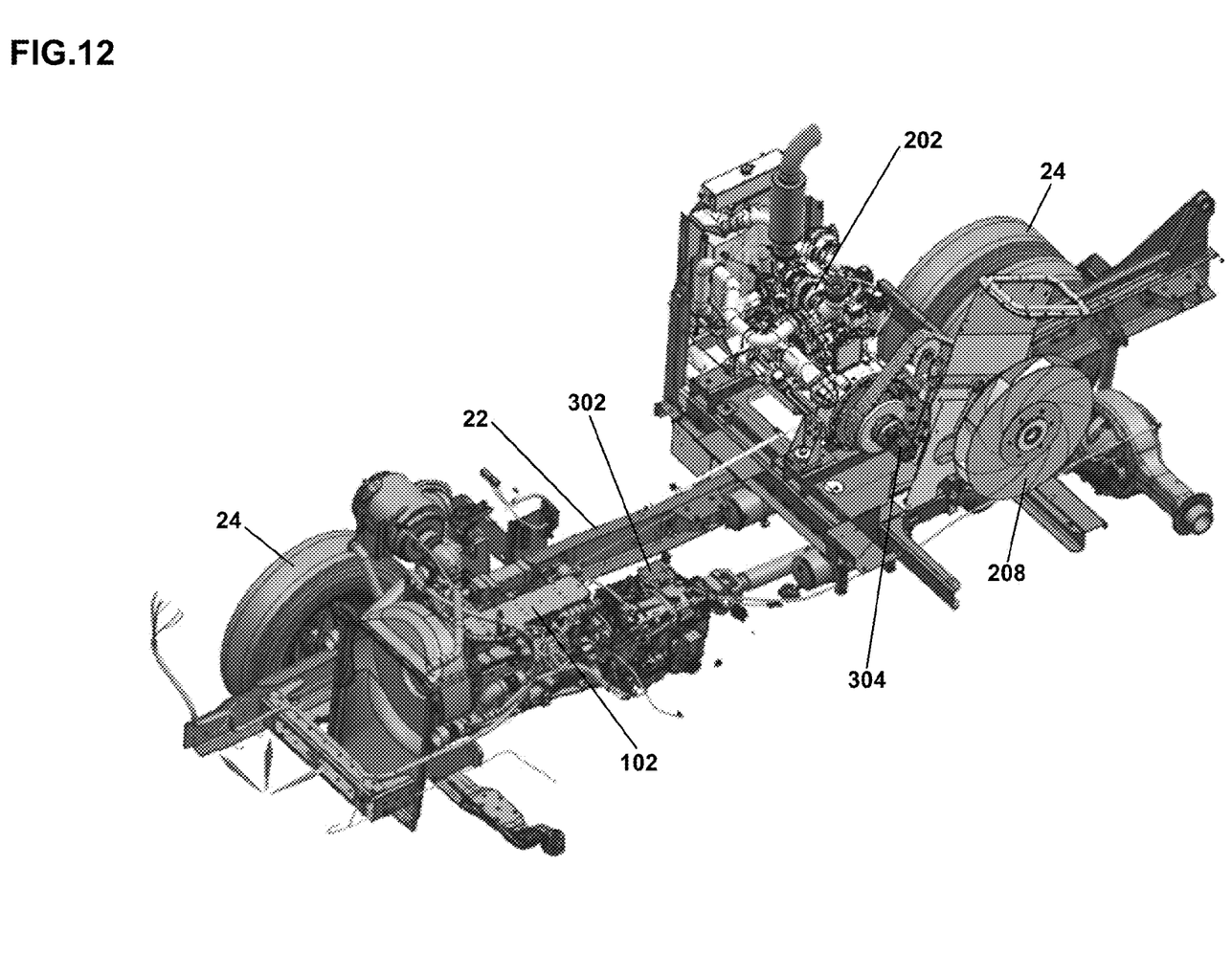
FIG. 12 is a perspective view of a portion of a street sweeping vehicle and the power delivery system shown in FIG. 1.

As shown, the power boost system 300 includes a first power transmission device 302 that is driven by a power output 150 of the chassis engine 102. The first power transmission device 302 is for transmitting power to a second power transmission device 304 via a power flow path 306. The second power transmission device 304 is for providing power to an output 250 of the auxiliary engine 202. Accordingly, the first and second power transmission devices 302, 304 operate together to transfer power from the output 150 of the chassis engine 102 to the output 250 of the auxiliary engine 202. Additionally, the first and second power transmission devices 302, 304 can be configured to transfer power in the opposite direction from the auxiliary engine output 205 to the chassis engine output 150. In one embodiment devices 302 and 304 are a hydraulic pump 302 and motor 304, respectively, in fluid communication with each other via a hydraulic circuit 306. FIG. 12 shows such an embodiment. In one embodiment, the hydraulic pump 302 is a variable displacement piston pump with pressure compensating controls to maintain a constant system pressure in the hydraulic system. In one embodiment, the hydraulic motor 304 is a fixed displacement gear motor. In one embodiment, each of the first and second power transmission devices 302, 304 are a hydraulic device configured to operate as both a pump and a motor.

Figure 2:
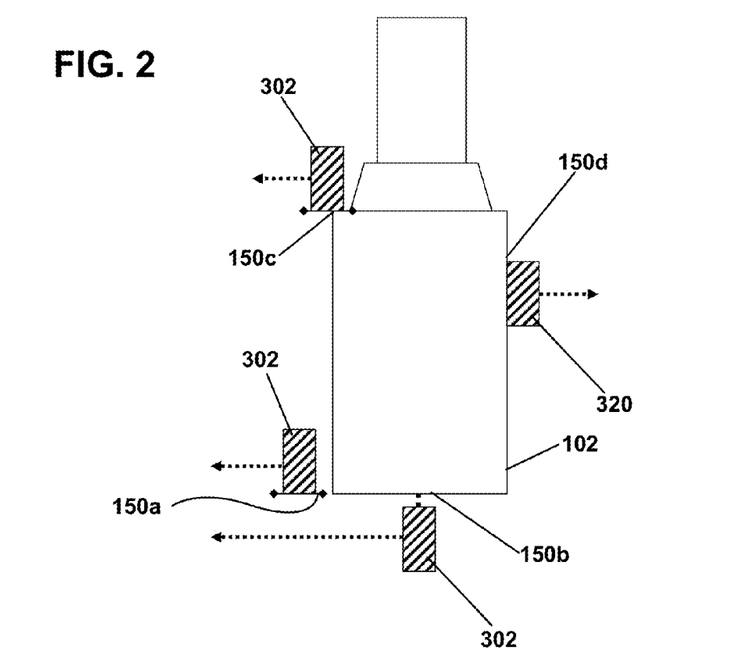
FIG. 2 is a schematic view of alternative first power transmission device positions suitable for use in the power delivery system shown in FIG. 1.

With reference to FIG. 1, the chassis engine output 150 corresponds to the output of the PTO 106. However, the chassis power system 100 and power boost system 300 can be configured to drive the first power transmission device 302 at other locations. FIG. 2 shows four alternative engine output sources for driving the first device 302: an accessory drive belt 150a; a front mounted PTO 150b; a rear mounted PTO 150c; and a gear drive 150d that can power an air compressor, a fuel injection pump, or a user installed accessory.

Figure 3:
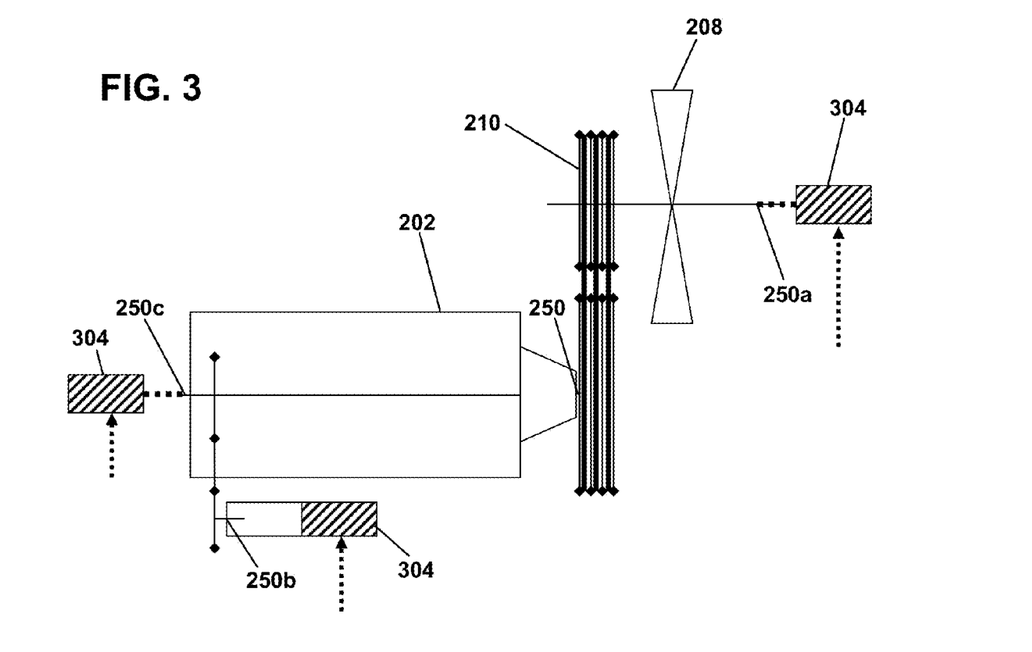
FIG. 3 is a schematic view of alternative second power transmission device positions suitable for use in the power delivery system shown in FIG. 1.

With reference to FIG. 1, the auxiliary engine output 250 corresponds to the auxiliary engine mounted PTO 206 that drives fan 208. However, the auxiliary power system 200 and power boost system 300 can be configured to input power from the second power transmission device 304 at other locations. FIG. 3 shows three alternative power input locations for the second device 304: a shaft 250a of fan 208; an additional PTO 250b output of the auxiliary engine 202; and a front accessory drive 250c of the auxiliary engine 202. Additionally, the power input can be at another power path, such as the gear drive that powers an air compressor, a fuel injection pump, or a user installed accessory.

Figure 4:
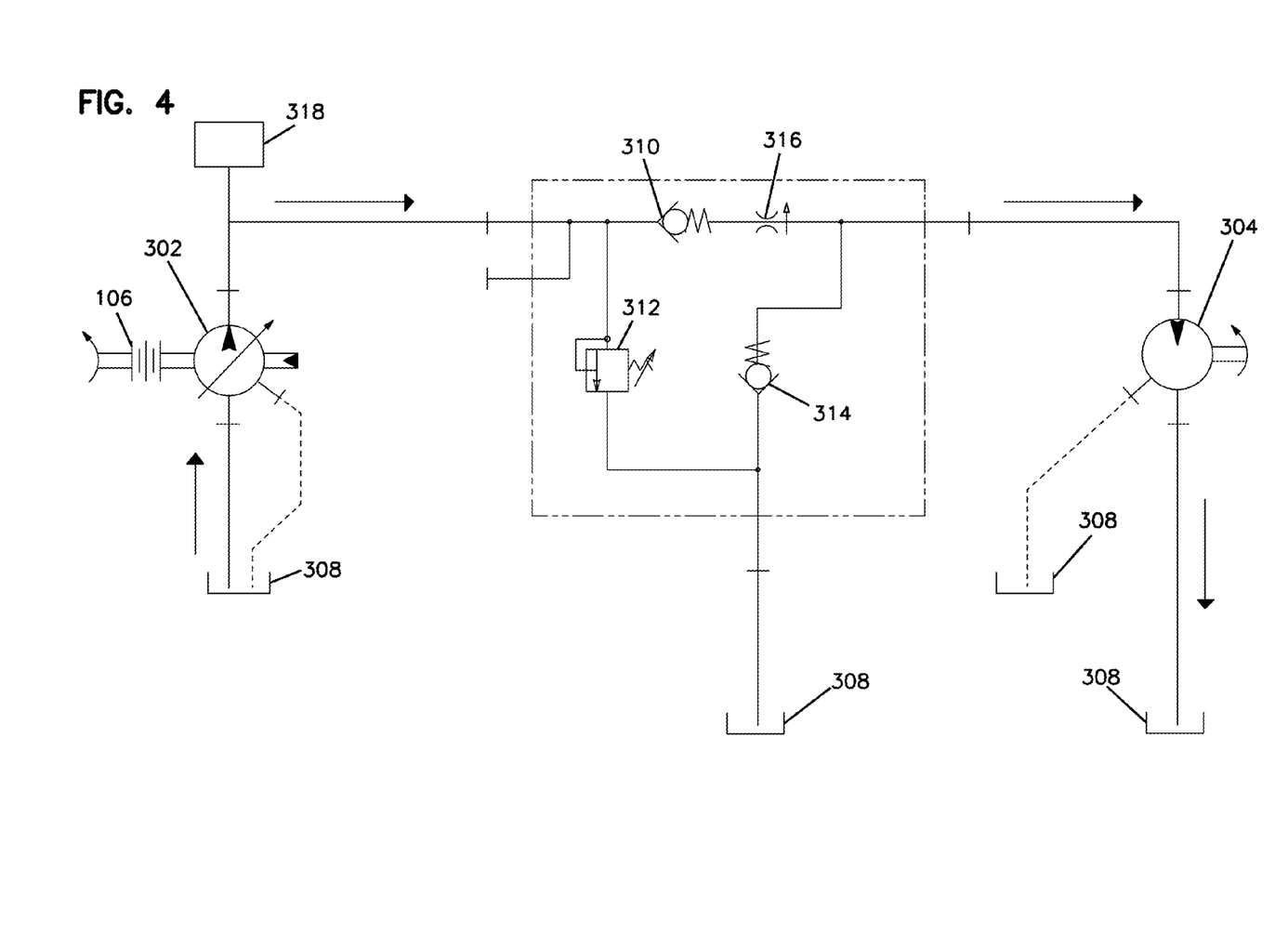
FIG. 4 is a schematic view of a power boost system suitable for use in the power delivery system shown in FIG. 1.

Referring to FIG. 4, an exemplary embodiment of a power boost system 300 is shown in which the system is based on hydraulic components. As such, the first power transmission device 302 will be referenced as pump 302 and the second power transmission device will be referenced as hydraulic motor 304. As shown, hydraulic pump 302 draws hydraulic fluid from a reservoir or tank 308. Downstream of the pump 302 is a spring check valve 310. Spring check valve 310 is for preventing hydraulic fluid from flowing in reverse from the hydraulic motor 304 towards the hydraulic pump 302. However, check valve 310 is not present where each of the devices 302, 304 are configured to function as either a motor or a pump so that power can be transmitted auxiliary engine to the chassis engine and vice versa.

Between the check valve 310 and the pump 302 is a pressure relief valve 312 which vents back to the tank 308. Pressure relief valve 312 is for protecting the hydraulic system from over pressurization. Downstream of the check valve 310 is an anti-cavitation check valve 314 in fluid communication with tank 308. The anti-cavitation valve is configured to permit hydraulic fluid to flow to the motor 304 even if there is a lack of flow from pump 302 and/or when the motor 304 is rotating at an excess capacity as compared to the pump 302 (i.e. when the motor 304 is winding down). Also downstream of the check valve 310 is a flow control valve 316 that can be utilized to regulate flow to the hydraulic motor 304 from the pump 302. In one embodiment, the flow control valve 316 will limit system flow in the event of a failure. FIG. 4 also shows the pump 302 engaged with the transmission mounted power take-off unit 106 wherein a PTO 106 is clutched to engage and disengage with the pump 302. Power boost system 300 can also be provided with a storage device 318, such as an accumulator 318, for reclaiming braking or energy normally lost to heat, and can provide an additional power source under high load conditions.

As configured in FIG. 4, the power boost system 300 can operate in a "shared power on" mode and a "shared power off" mode. In the shared power on mode, the clutched PTO 106 engages to drive the hydraulic pump 302. The flow from the pump 302 will cause the hydraulic motor 304 to rotate at the speed of the auxiliary engine component to which it is connected.

In one embodiment, a transmission mounted, PTO driven first power transmission device 302 is utilized in a configuration where the PTO output is dependent upon the travel speed of the vehicle 20, as is the case with an Allison 2500

RDS transmission, and similar designs. In such a case, the PTO 106 is driven at "turbine speed" wherein the turbine rotational speed is nearly equal to the engine crankshaft rotational speed. This is the case except when the transmission 104 is in gear and the vehicle 20 is at a full stop. In this configuration, full power is available once the vehicle 20 exceeds a minimum travel speed, or if the transmission 104 is in the neutral position. Accordingly, the first device 302 will be driven by the PTO 106 whenever the vehicle 20 is in motion and the transmission is in a non-neutral gear. This configuration additionally allows for energy to be reclaimed during braking, and/or engine-braking events. Also, power to the first device 302 can be selectively turned off when not required. When first device 302 is operational, the first device 302 can be selectively controlled to meet the second device 304 speed requirements.

In one embodiment, a transmission mounted, PTO driven first power transmission device 302 is utilized in a configuration where the PTO 106 is driven by the engine crankshaft, as is the case with an Allison 3500 RDS transmission, and similar designs. In such a configuration, power output from the PTO 106 is available whenever the engine 102 is rotating. Accordingly, full power to the first device 302 is always available regardless of vehicle 20 speed. If a transmission gear is selected that allows the engine to be back-driven during decelerations, the first device 302 will be driven whenever the vehicle 20 is in motion. In such a configuration, energy can be reclaimed through the first device 302 during braking, and/or engine-braking events. Also, power to the first device 302 can be selectively turned off when not required. When first device 302 is operational, the device 302 can be selectively controlled to meet the second device 304 speed requirements.

In the shared power off mode, the clutched PTO 106 disengages with the first power transmission device 302 such that the device 302 will not rotate and no power is transmitted (i.e. no hydraulic fluid flow is produced in a hydraulic circuit). In a hydraulic based embodiment, a pump check valve 310 can be used to ensure that reverse hydraulic flow will not cause the pump 302 to rotate in the opposite direction. However, when the auxiliary engine 202 is operating, the second device 304 can be rotated by the engine 202. When this occurs, the motor 304 operates as a pump and hydraulic fluid is allowed to circulate between the tank 308 and the motor 304 via the flow path defined by the anti-cavitation valve 314. Alternatively, the hydraulic motor 304 can utilize a clutch instead of adapter 216, such that the motor 304 can be disengaged from the auxiliary engine output 250 when not in use. In one embodiment, the clutch is an overrunning clutch. A clutch may also be electrically or otherwise selectively controlled to engage and disengage with the motor 304.

In one embodiment, the second power transmission device 304 provides power to the first power transmission device 302 in a second power sharing mode such that the auxiliary engine 202 can provide power to the chassis engine 102. This mode of operation is beneficial in applications where the chassis engine may be underpowered due to any number of factors.

Although power boost system 300 has been described in detail with hydraulic components, other types of power transfer systems may be utilized as well for the first and second power transmission devices 302, 304 shown in FIG. 1. For example, the first and second power transmission devices 302, 304 of FIG. 1 can be electrical generators and motors. Pneumatic based components such as air pumps and air motors could also be utilized for the first and second devices 302, 304. Also, electrical batteries, electrical capacitors, and/or air tanks may be utilized to store regeneration energy, for example from slowing, braking, or engine-braking the vehicle 20.

It is also noted that the power boost system 300 can be retrofitted onto an existing vehicle 20 already configured with a chassis engine and an auxiliary engine. In such an application, the power boost system 300 can be turned off or disconnected without any loss in functionality of the chassis and auxiliary engine systems. In a new system, the auxiliary engine 202 can be sized smaller than a traditionally sized dual engine system, as the power from the chassis engine augments the auxiliary engine power. For example, instead of installing an auxiliary engine having a rated power output in the range of 99 to 115 horsepower, a smaller 74 horsepower engine could be installed. Since the chassis engine 102 is generally underutilized during sweeping operations, the chassis engine 102 will be able to transfer the remaining 25 to 41 horsepower to the auxiliary engine. Accordingly, the maximum output capacity of the auxiliary engine can actually be designed to be less than the maximum input power requirements for the powered non-driving functions of the vehicle 20.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the disclosure.

What is claimed is:
1. A power delivery system for a vehicle, the power delivery system comprising:
   a. a chassis engine configured to power driving functions of the vehicle;
   b. an auxiliary engine configured to power non-driving functions of the vehicle;
   c. a hydraulic pump selectively engaged with the chassis engine and having a fluid inlet and a fluid outlet;
   d. a hydraulic motor engaged with the auxiliary engine and having a fluid inlet and a fluid outlet; and
   e. a hydraulic circuit including:
      i. a fluid reservoir;
      ii. a first hydraulic branch line extending between the hydraulic pump fluid outlet and the hydraulic motor fluid inlet;
      iii. a second hydraulic branch line extending between the first hydraulic branch line and the fluid reservoir;
      iv. a valve assembly in fluid communication with the first and second hydraulic branch lines;
   f. the power delivery system having a shared power ON mode in which power is transferred from the chassis engine to the auxiliary engine, wherein:
      i. the hydraulic pump is engaged with the chassis engine;
      ii. the valve assembly places the hydraulic pump fluid outlet in fluid communication with the hydraulic motor fluid inlet;
   g. the power delivery system having a shared power OFF mode in which no power is transferred from the chassis engine to the auxiliary engine, wherein:
      i. the hydraulic pump is disengaged from the chassis engine;
      ii. the valve assembly places the hydraulic motor fluid inlet in fluid communication with the reservoir via the second hydraulic branch line.

2. The power delivery system of claim 1, wherein the at least one non-driving function powered by the auxiliary engine is one or more of a broom and a fan of a street sweeping vehicle.

3. The power delivery system of claim 1, wherein a maximum output capacity of the auxiliary engine is less than a maximum input power requirement for the at least one powered non-driving function.

4. The power delivery system of claim 1, wherein:
   a. the hydraulic pump is selectively engaged with the chassis engine via a clutched power take-off unit; and
   b. the hydraulic motor is engaged with a power take-off unit associated with the auxiliary engine.

5. The power delivery system of claim 1, wherein the valve assembly includes:
   a. a first check valve located in the first hydraulic branch line and oriented to prevent hydraulic fluid in the first hydraulic branch line from flowing in a direction from the hydraulic motor towards the hydraulic pump; and
   b. a second check valve located in the second hydraulic branch line and oriented to prevent hydraulic fluid in the second hydraulic branch line from flowing in a direction from the first hydraulic branch line towards the reservoir.

6. The power delivery system of claim 5, wherein the valve assembly further includes:
   a. a flow control valve located in the first hydraulic branch line configured to regulate flow to the hydraulic motor from the hydraulic pump.

7. The power delivery system of claim 6, wherein the valve assembly further includes:
   a. a relief valve in fluid communication with the hydraulic pump and the reservoir, the relief valve being configured to prevent over pressurization of the hydraulic circuit and the hydraulic pump.

8. The power delivery system of claim 1, wherein the power delivery system further comprises an energy storage device for storing energy developed during vehicle braking.

9. The power delivery system of claim 8, wherein the energy storage device is an accumulator.

* * * * *